2,880,939

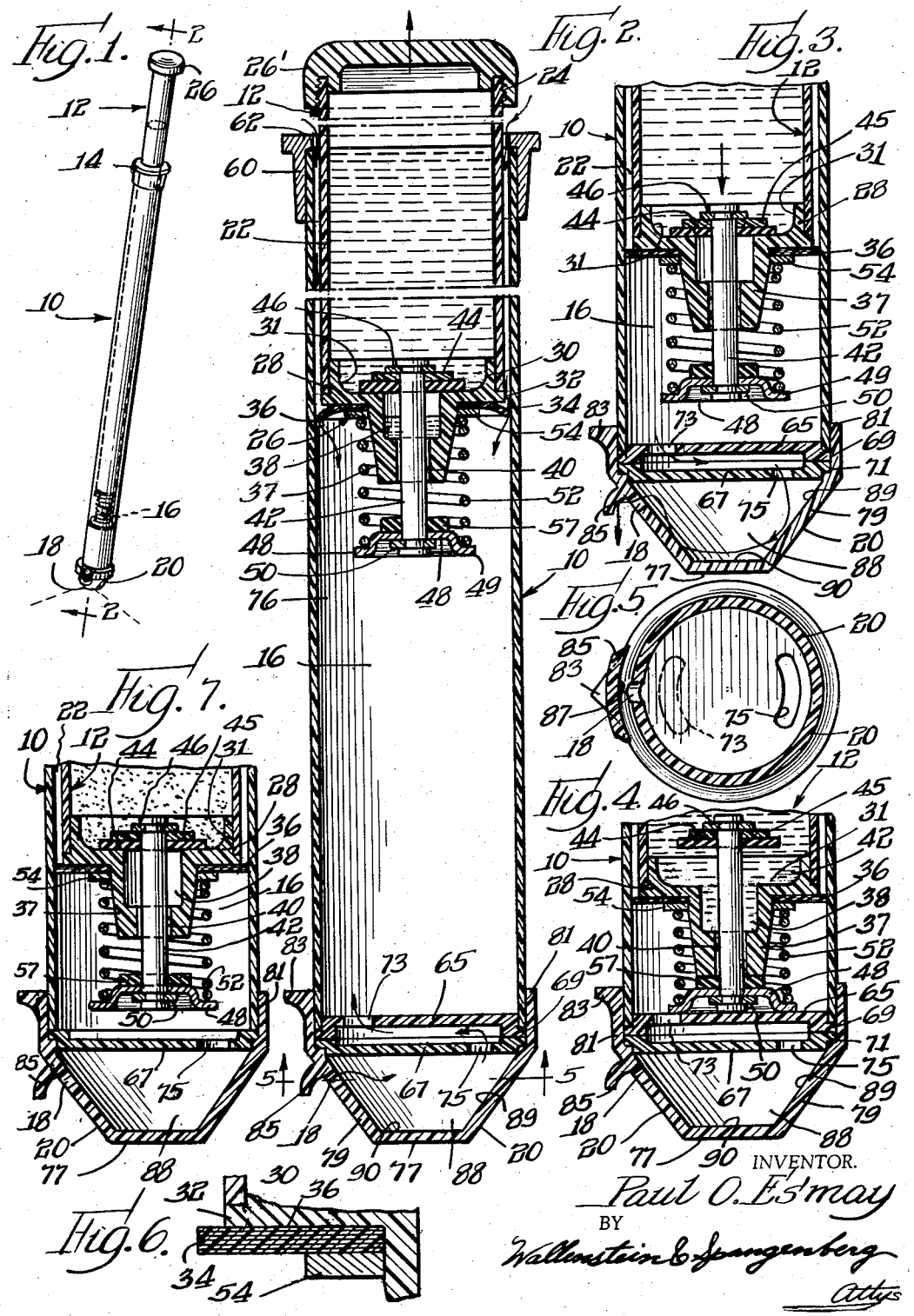
April 7, 1959  P. O. ESMAY  2,880,939
GARDEN SPRAY GUN
Filed Feb. 6, 1957
INVENTOR.
Paul O. Esmay
BY Wallenstein & Spangenberg
Attys

United States Patent Office 2,880,939
Patented Apr. 7, 1959

GARDEN SPRAY GUN

Paul O. Esmay, Three Rivers, Mich.

Application February 6, 1957, Serial No. 638,524

25 Claims. (Cl. 239—331)

This invention relates to a device for spraying garden chemicals for killing weeds, insects and the like, particularly to a device of this type which sprays liquid materials in a finely divided or atomized form. The invention has its most practical utility in the form of a light-in-weight, portable, hand-operated spray gun.

Heretofore, hand-operated liquid spray devices were unsatisfactory for many reasons among these being that they operated on a principle of the building up of relatively high pressures by hand-pumping action which made them tedious to operate, and then forcing a relatively small volume of air and the material to be sprayed through a very small orifice. The smallness of the orifice often resulted in the clogging thereof by dust or dirt. Also, the stream issuing from the orifice quickly dissipated which required the operator to place the spray device relatively close to the plants being sprayed. Moreover, the design of the spray devices was such that separate spray guns were required for dispensing liquid and pulverulent materials, respectively. Other disadvantages found in prior spray guns included high cost, inability to withstand long usage without clogging or breakage of parts, and difficulty in controlling the quantity or concentration of the dispensed material.

Among the main objects of the present invention are to provide a spray gun of the hand-operated type which can spray a liquid chemical material in atomized form over a much greater area and for a greater distance per unit of applied force than was heretofore possible with prior liquid-spray devices.

A further object of the present invention is to provide a spray gun capable of dispensing either liquid or pulverulent materials selectively over a small or a large area, or directed downwardly or upwardly while the operator holds the spray gun in the same comfortable position.

A still further object of the invention is to provide a spray gun of the plunger type having a novel, rugged, long-lasting valve seal around the plunger which readily flexes during the intake stroke of the plunger to allow passage of air into a pumping space, and which, during the compression stroke, provides a good pressure seal while enabling the plunger to be moved with ease.

In the most preferred form of the invention, the spray gun preferably comprises an outer, elongated cylindrical tube preferably made of a transparent plastic material and a plunger supply tube preferably made of a transparent plastic material loosely telescoped within the upper end of the outer tube and having a length preferably of the same order of magnitude as the outer tube. Thus, the plunger tube may be grasped and reciprocated within the outer tube for substantially the entire length of the outer tube or for any fractional part thereof. The plunger tube contains the material to be sprayed and the bottom of the plunger tube contains a spring-urged valve assembly, which, when the plunger tube is fully extended into the outer tube, fully opens to dispense a fixed quantity of material into a receiving well at the bottom of the plunger tube. The restraining force of the valve spring is preferably adjusted so that it opens slightly under the back pressure built up during the compression stroke to cause air pressure to build up in the plunger tube. Then, when the plunger tube reaches the bottom of its stroke and the valve is fully opened, material is dispensed therefrom under pressure preventing clogging of the valve and providing a quick, positive dispensing operation. Upon upward movement of the plunger tube, the material in the above-mentioned well gradually leaks through a relatively small passage in the bottom of the well into the pumping space below the plunger tube. The plunger tube also carries an air valve means, preferably in the form of a stack of thin polyethylene discs which are braced against a downwardly directed shoulder at the bottom of the plunger tube, the discs having peripheral portions which are downwardly flexible during the upstroke of the plunger tube when vacuum in the pumping space draws air from the top of the outer tube, through the annular space between the inner and outer tubes and around the outside of the downwardly flexed peripheral portions of the valve discs. The relatively slow leakage of material to be sprayed from the above-mentioned well at the bottom of the plunger tube provides maximum intermixing of the air and material to be sprayed in the pumping space. Upon the downward movement of the plunger tube, the mixture of air and material to be sprayed in the pumping space is forced through a tortuous passage leading to a relatively large discharge orifice formed at the bottom of the outer tube. The tortuous path creates a turbulence which aids in atomizing the material being sprayed.

Where the spray gun is to be used with both liquid as well as pulverulent materials, the tortuous path is preferably formed in part by a single transverse wall extending across the bottom of the outer tube, the wall being provided with an opening near the periphery thereof which communicates with a mixing space or chamber defined by a dome-shaped end cap secured to the bottom end of the outer tube. The dome-shaped end cap has a relatively large discharge orifice relative to those generally used for liquid spray devices which orifice is formed in a downwardly and inwardly inclined wall portion thereof in a position diametrically opposed to the position of the opening in the aforementioned transverse wall. In this way, the mixture of air and material to be sprayed follows a tortuous path in its flow from the pumping space to the discharge orifice. By tilting the spray gun downwardly and rotating the spray gun along its longitudinal axis, the spray issuing from the discharge orifice at the bottom end of the gun may be directed at any angle downwardly or upwardly.

The dome-shaped end cap is preferably also provided with a spray-shaping means preferably in the form of a deflector lip extending from above the discharge orifice at a point directly in front thereof to fan out the spray in a direction away from the operator. With the large volume of air moving through the discharge orifice each pumping cycle and the fanning out of the discharging stream, a large area can be blanketed with a small effort.

Since a fixed quantity of material is dispensed into the pumping space each pumping cycle, the concentration of the stream of material issuing from the discharge orifice can be varied by varying the volume of air moved each pumping cycle which is accomplished by changing the length of the pumping stroke of the plunger tube.

A spray gun constructed in accordance with the present invention is thus very versatile and is easy to operate, is rugged in construction, never clogs even when used with pulverulent materials and is inexpensive to construct.

Other objects, advantages and features of the invention will become apparent upon making reference to the specification to follow and the drawings wherein:

Fig. 1 is a perspective view of one form of the invention which is particularly suitable for spraying liquid materials;

Fig. 2 is an enlarged longitudinal sectional view of the spray gun of Fig. 1, taken along section line 2—2, when the plunger tube is being moved upward within the outer tube, the arrows therein showing the path of movement of air and material to be sprayed into the pumping space;

Fig. 3 is a fragmentary longitudinal sectional view corresponding to Fig. 2, showing the position of the plunger tube and the path of fluid flow during the compression stroke of the plunger tube;

Fig. 4 is a view corresponding to the view of Fig. 3 showing the bottom of the plunger tube in contact with the bottom of the outer tube and the consequent opening of the dispensing valve at the bottom of the plunger tube when the receiving well is filled with a finite quantity of fluid;

Fig. 5 is a transverse section through the discharge end of the tube, taken along section line 5—5 in Fig. 2;

Fig. 6 is a fragmentary enlarged view of the plunger tube showing the valve discs attached to the end thereof; and Fig. 7 is a fragmentary longitudinal view of the preferred form of the invention which is adaptable to the dispensing of either liquid or pulverulent materials.

In the preferred forms of the invention, illustrated in the drawings, the gun comprises an outer elongated, cylindrical tube 10 made preferably of a transparent plastic material, such as Tenite Butyrate, a mixed ester composition made by Eastman Chemical Products, Inc., and an inner elongated cylindrical plunger tube 12 carrying the supply of material to be sprayed and made of the same transparent material and having a length of the same order of magnitude as the outer tube. The plunger tube 12 is reciprocally mounted within the outer tube 10, the plunger tube extending from an open upper end 14 thereof so that the plunger tube may be easily grasped and reciprocated for substantially the full length of the outer tube. In a manner to be explained hereinafter, during the upward strokes of the plunger tube, air is drawn into a pumping space 16 beneath the plunger tube, and the material to be dispensed is deposited in the pumping space; and, during the down stroke of the plunger tube, the material to be sprayed is discharged in atomized form through a discharge orifice 18 formed in a dome-shaped end cap 20 connected to the bottom end of the outer tube 10. Now that the overall make-up and operation of the spray device has been briefly explained, the detailed construction of the various components making up the spray gun will be described.

Referring now more particularly to Figs. 2–6, the plunger tube 12 has an outer diameter somewhat smaller than the inner diameter of the outer tube 10 so that the former fits loosely within the latter to provide an annular air-intake passage 22 therebetween. The very top of the plunger tube is externally threaded as at 24 to threadedly receive a closure cap 26', and the bottom of the plunger tube is closed by an end cap and valve assembly 26. The end cap assembly comprises an end cap member 28 which is preferably made of the same material as tube 12 and has a cylindrical skirt portion 30 defining a valve seat recess 31, the skirt portion fitting within the plunger tube and preferably cemented to the inner walls thereof. The end cap member has a flanged portion 32 which underlies the end of the plunger tube and has a bottom annular shoulder-forming portion 34 against which a stack of preferably polyethylene valve discs 36, to be described in more detail hereinafter, bear. The discs freely slideably engage the inner walls of the outer tube during the downward stroke of the plunger tube to seal off the annular space 22 between the inner and outer tubes from the pumping space 16.

The end cap member 28 has a central depending boss 37 which has a central cylindrical well 38 formed therein which opens onto the center portion of a larger valve-seat recess 31 formed in the skirt portion 30 of the end cap member 28. The boss 37 also has a central bore 40 which extends from the bottom surface of the boss to the bottom of the well 38.

Extending freely through the boss bore 40 and the well 38 and terminating within the valve seat recess 31 is a valve stem 42 made of metal or other suitable material. The valve stem 42 has a rubber valve head 44 snugly applied thereover and held upon the stem by a metal snap ring 46 extending within an annular groove formed within the valve stem 42. At the bottom end of the valve stem there is provided an inverted, flanged metal cup-shaped member 48 which snugly surrounds the valve stem and is held thereupon by a metal snap ring 50 fitting within an annular groove formed in the valve stem. The member 48 has a peripheral flange 49 thereon forming a shoulder for receiving the bottom end of a metal coil compression spring 52 whose upper end bears against a metal washer 54 which contacts the valve disc assembly 36 to hold the same in place upon the plunger tube. The spring 52 urges the valve stem 42 downward and hence the valve head 44 upon the bottom of the valve seat 31, closing off the opening between the well 38 and the compartment within the plunger tube 12 containing the material to be sprayed.

Secured upon the inverted cup-shaped member 48 is a rubber washer 57 which engages the bottom of the end cap boss 36 when the valve stem is pushed upwardly to prevent leakage of the material through the end cap well 38 and the clearance space between the defining walls of bore 40 and the valve stem 42 into pumping space 16, should the operator lean against the plunger tube. (The latter clearance space normally enables the slow leakage of material from the well 38 into the pumping space during the upward movement of the plunger tube.)

Referring now to the construction of the outer tube 10, this tube is provided at its top with an annular sleeve member 60 made of preferably the same material as the tube 10 itself, which sleeve is cemented to the latter tube. The sleeve 60 has an inwardly extending portion 62 which overlaps and extends a small distance beyond the inner surface of the tube 10 to extend contiguous to the plunger tube, but with a small air passage space provided therebetween, to provide support for the plunger tube.

In the embodiment illustrated in Figs. 2–4 the bottom end of the outer tube is provided with a pair of axially-spaced, baffle-forming transverse walls 65—67. These walls have confronting peripheral flanges 69—71 which are cemented together and to the bottom edge of the outer tube. These walls may be made of a material similar to that out of which the outer tube is made. The innermost or uppermost wall 65 has a circumferential opening or slot 73 adjacent its perimeter and the lowermost or outermost wall 69 has a similar circumferential slot or opening 75 located contiguous to its perimeter at a point diametrically opposite the slot 73. In this manner, a tortuous path for the flow of air and material to be sprayed is provided between the pumping space 16 and the slot 75 of the outermost wall 67.

Covering the baffle-forming walls is the above mentioned dome-shaped end cap 20 of the outer tube which may be made of the same material as tube 10. This end cap has a flat bottom or end portion 77 of a much smaller size than the diameter of the outer tube and a frusto-conical wall portion 79 extending upwardly and outwardly from the flat bottom 77 and terminating in a generally cylindrical skirt portion 81 having a radially projecting portion 83 at one point thereon. The frusto-conical wall 79 contains the aforementioned discharge orifice 18 which is located at the same circumferential position as the radial projection 83 of the end cap and the center line of the circumferential slot 73 of the uppermost or innermost baffle-forming wall 65. The radial projection 83 indicates to the operator the location of the discharge orifice 18 so that he may properly position the spray gun to discharge the spray in the proper direction.

In order to fan out the fluid stream discharging from the orifice 18, a deflector lip 85 is preferably formed integrally with the body of end cap 20 above the discharge orifice. The deflector lip 85 has a concave inner surface 87 against which the emerging stream of fluid impinges and deflects laterally outwardly.

The dome-shaped end cap member 20 defines an unobstructed space 88 therein of generally the same shape as the end cap member itself. The inner surface 89—90 thereof define the extremities of the space 88 and aid in guiding the mixture of air and liquid from the opening 75 in the wall 67 to the discharge orifice 18.

The baffle wall design of Figs. 2–4 is particularly useful in the spraying of liquid materials since the space defined between the walls 65 and 67 aids greatly in mixing the liquid and air. The embodiment of Fig. 7 is substantially the same as the embodiment of Figs. 2–4 except that only a single baffle wall 67 is utilized having a circumferential slot or opening 75 near the side thereof which is diametrically opposite the position of the discharge orifice 18. In both embodiments, a tortuous path is provided by the baffle-forming wall or walls and the inner surfaces of end cap 20. The embodiment of Fig. 7 is useful both for spraying liquid and pulverulent materials, the use of a double baffle wall for pulverulent materials being obviated because of the chance of clogging of the powder within the small space between the walls 65 and 67.

Although the dimensions of the various parts of the gun and the clearance space and openings may be varied over fairly wide limits, the following are the dimensions which are preferred for some of these portions of the spray gun. The valve discs preferably each has a thickness of from 0.003–0.006″, six such discs making up the stack 36 shown in Fig. 6. The preferred material out of which the discs are made is Tenite Polyethylene manufactured by the Eastman Chemical Products, Inc., a subsidiary of the Eastman Kodak Company.

The clearance betwen the valve stem 42 and the bore 40 may be in the vicinity of 1/64″.

The discharge orifice 18 preferably has a diameter in the vicinity from 1/32–5/32″, preferably 3/32″ in the case where both liquid and pulverulent materials are used. The baffle wall slots preferably have overall dimensions of about 1/8″ wide and 1/2″ long.

The operation of the spray gun of the invention is as follows: When the plunger tube 12 is telescoped within the outer tube near but not quite to its fullest extent, the cup-shaped member 48 at the bottom of the plunger tube makes contact with the uppermost baffle wall to place the spring 52 under compression. The plunger tube then moves downward a small amount until the bottom of the boss 36 of the end cap member 28 touches the top of the rubber gasket 57 to seal off the clearance space 40 between the valve stem 42 and the bore 40. In this position of the plunger tube, the valve head 44 is spaced from the top of the well 38 so that the material to be sprayed within the plunger tube quickly fills the well 38. As the plunger tube is pulled upwardly within the outer tube, the spring 52 expands and presses the cup-shaped member 48 downward to bring the valve head 44 tightly around the well 38 thereby sealing off the well from the supply compartment within the plunger tube. The material then in the well 38 slowly leaks through the clearance space 40 into the pumping space 16 beneath the plunger tube. Withdrawing the plunger tube from the outer tube reduces the pressure in the pumping space 16 substantially below atmospheric pressure so that air is drawn into the pumping space through the clearance between the plunger tube and the sleeve 30 in the main body of the outer tube. The differential pressure existing between pumping space 16 and the annular clearance space 22 above the valve disc assembly 28 is sufficient to deform or force the peripheral portions of the disc assembly downwardly, as shown in Fig. 2, to enable passage of air into the pumping space 16. A much smaller quantity of air enters the pumping space 16 through the discharge orifice 18 in the bottom of the outer tube 10, but this air moving quickly aids in unclogging the passages leading to the pumping space and in creating a turbulence which aids in mixing the material to be sprayed and the air. Thus, the gradual dropping of the material in the well 38 into the pumping space 16 together with the sucking of air into the pumping space greatly aids in admixing the material to be sprayed and the air. Additionally, the degree of upward movement imparted to the plunger tube is a function of the concentration of the spray desired. The greater the upward movement, the greater the amount of air sucked into the pumping space 16 and therefore the less concentrated is the atomized spray issuing from the discharge orifice upon the downward stroke of the plunger tube.

Upon downward movement of the plunger tube, pressure builds up in the pumping space 16 which forces the peripheral portions of the valve disc assembly 36 tightly against the inner walls of the outer tube to form an air tight seal therewith. The material out of which the discs are made enables the discs to be slid along the inner surface of the outer tube with a small physical effort by the operator. This build-up of pressure is applied against the cup-shaped member 48. The spring 52 is preferably selected so that it will give a little (i.e. not enough to result in any leakage of material from the plunger tube) under this pressure so that air under pressure will leak under the valve head 44 and into the plunger tube raising the pressure therein. The compression stroke, of course, also forces the mixture of air and the material to be sprayed through the path indicated by the arrows in the embodiments of Figs. 3 and 7. This path extends through the opening or openings in the baffle walls and then along the sides of the space 88 formed within the dome-shaped end cap 20 following a generally tortuous path to the discharge orifice 18. The tortuous path creates a turbulence which greatly increases the intermixture of the air and the material to be sprayed and hence the degree of atomization of the latter material. As the mixture passes through the discharge orifice, it strikes the deflector lip 85 and fans outwardly, as shown most clearly in Fig. 1.

During the pumping of the plunger tube, the spray gun is preferably held in a downwardly inclining direction so that, when the cup-shaped member 48 strikes the baffle wall at the bottom of the outer tube 10 and the valve head 44 is raised, the well 38 will fill through force of gravity and also through the force of the pressure built up in the plunger tube.

The spray gun of the invention can be used to dispense a weed killer chemical by holding the discharge orifice close to the area to be sprayed, where the weeds cover only a limited area. Obviously, a much greater area can be sprayed by raising the bottom of the spray gun further from the ground. The spray may be directed in practically any direction, that is upwardly or downwardly, by the simple expedient of holding the spray gun at an angle with the bottom thereof pointing toward the ground, and then rotating the spray gun about its longitudinal axis to bring the discharge orifice into a position where it faces in the direction in which the spray is desired. The large volume of air moved each pumping cycle and the fanning out of the spray by the deflector lip enable large areas to be blanketed by a single easy pumping stroke.

The pressure variations built up through the spray gun, and particularly between the pumping space 16 and the inside of the plunger tube upon raising of the valve head, prevents the clogging of the various passages in the gun particularly when pulverulent materials are used.

Clogging of the discharge orifice is also unlikely due to the relatively large size thereof permitted by the spray gun design of the invention.

The present invention has thus provided a spray gun of exceedingly simple construction which can spray large amounts of either pulverulent or liquid materials in practically any direction with a small effort. Further, the construction is such that the pressure changes existing in various parts thereof is sufficient to loosen any powdery materials to be sprayed from the various wall surfaces to avoid clogging. Furthermore, the parts are ruggedly designed and their assembly is such that the device will operate smoothly and efficiently for an indefinitely long period of time.

It should be understood that numerous modifications may be made of the preferred form of the invention above described without deviating from the broader aspects of the invention.

I claim as my invention:

1. A spray gun comprising a hand-operated plunger tube slidably disposed within an outer tubular member for reciprocation therein and having a discharge orifice at one end, the plunger tube having a compartment therein for holding the material to be sprayed, valve means on said plunger tube for automatically gradually dispensing a limited quantity of the material to be sprayed into a pumping space ahead of said plunger tube during the movement of said plunger tube away from said space, said pumping space communicating with said discharge orifice, and an air inlet passage extending between the outside of said outer tubular member to said pumping space and bypassing said plunger tube compartment, and valve means operable to open said passage during movement of said plunger tube away from said pumping space wherein air is drawn by suction through said passage into said space, and operable to close said passage during movement of said plunger tube toward said pumping space so that the air in said space is forced by compression into intimate admixture with said material to be sprayed and through said discharge orifice.

2. A spray gun comprising a hand-operated plunger tube slidably disposed within an outer tubular member for reciprocation therein and having a discharge orifice at one end, the plunger tube having a compartment therein for holding the material to be sprayed, valve means on said plunger tube for automatically dispensing a limited quantity of the material to be sprayed into a pumping space ahead of said plunger tube prior to the initiation of each compression stroke thereof, said pumping space communicating with said discharge orifice, an air inlet passage extending between the outside of said outer tubular member to said pumping space and bypassing said plunger tube compartment, and valve means operable to open said passage during movement of said plunger tube away from said pumping space wherein air is drawn by suction through said passage into said space, and operable to close said passage during movement of said plunger tube toward said pumping space so that the air in said space is forced by compression into intimate admixture with said material to be sprayed and through said discharge orifice, and a deflector member mounted on the outside of said outer tubular member in the path of the fluid stream being discharged from said discharge orifice for fanning the stream outwardly.

3. A spray gun for spraying liquid material comprising a hand-operated plunger tube slidably disposed within an outer tubular member for reciprocation therein and having a discharge orifice at one end, the plunger tube having a compartment therein filled with a liquid to be sprayed, valve means on said plunger tube for automatically dispensing a limited quantity of the material to be sprayed into a pumping space ahead of said plunger tube prior to the initiation of each compression stroke thereof, said pumping space communicating with said discharge orifice, and an air inlet passage extending between the outside of said outer tubular member to said pumping space and bypassing said plunger tube compartment, and valve means operable to open said passage during movement of said plunger tube away from said pumping space wherein air is drawn by suction through said passage into said space, and operable to close said passage during movement of said plunger tube toward said pumping space so that the air in said space is forced by compression into intimate admixture with said material to be sprayed and through said discharge orifice.

4. A spray gun comprising a hand-operated plunger tube slidably disposed within an outer tubular member for reciprocation therein and having a discharge orifice at one end, the plunger tube having a compartment therein for holding the material to be sprayed, valve means on said plunger tube for automatically dispensing a limited quantity of the material to be sprayed into pumping space ahead of said plunger tube prior to the initiation of each compression stroke thereof, said pumping space communicating with said discharge orifice, means forming a tortuous path between said pumping space and discharge orifice for enabling a thorough intermixture of air and the material to be sprayed, and an air inlet passage extending between the outside of said outer tubular member to said pumping space and bypassing said plunger tube compartment, and valve means operable to open said passage during movement of said plunger tube away from said pumping space wherein air is drawn by suction through said passage into said space, and operable to close said passage during movement of said plunger tube toward said pumping space so that the air in said space is forced by compression into intimate admixture with said material to be sprayed and through said tortuous path and discharge orifice.

5. A spray gun comprising an outer elongated tubular member having an external discharge orifice means at one end thereof, an elongated plunger tube for holding a supply of said material to be sprayed slidably telescoped within said outer elongated tubular member, said plunger tube having a hand-receiving portion so that the inner end of the same can be reciprocated between the ends of said outer tubular member, said plunger tube being spaced from said outer tubular member to provide an annular air intake space, one-way valve means carried by said plunger tube for sealing off said annular space during the movement of said latter tube toward the discharge end of said outer tubular member and for providing an open passage for air into a pumping space ahead of said plunger tube during the movement of the latter tube toward the other end of said outer tubular member, and dispensing valve means at the discharge or inner end of said plunger tube for dispensing a limited quantity of material therefrom into said pumping space after the termination of each compression stroke thereof, said dispensed material being forced out of said pumping space and through said discharge orifice means during each compression stroke.

6. A spray gun comprising an outer elongated tubular member having an external discharge orifice means at one end thereof, the other end being open, an elongated plunger tube for holding a supply of said material to be sprayed slidably telescoped within said outer elongated tubular member, said plunger tube extending from the open end of said outer tubular member so that the inner end thereof can be reciprocated between the ends of said outer tubular member, said plunger tube being spaced from said outer tubular member to provide an annular air intake space, one-way valve means carried by said plunger tube for sealing off said annular space during the movement of said latter tube toward the discharge end of said outer tubular member and for providing an open passage for air into a pumping space ahead of said plunger tube during the movement of the latter tube toward the other end of said outer tubular member, and dispensing valve means at the discharge or inner end of said plunger tube for dispensing a limited quantity of material therefrom into said pumping space after the termination of each compression stroke thereof, said dispensed material being forced out of said pumping space and through said discharge orifice means during each compression stroke.

7. A spray gun for spraying liquid material comprising an outer elongated tubular member having an external discharge orifice means at one end thereof, an elongated plunger tube containing a supply of liquid material to be sprayed slidably telescoped within said outer elongated tubular member, said plunger tube having a hand-receiving portion so that the inner end thereof can be reciprocated between the ends of said outer tubular member, said plunger tube being spaced from said outer tubular member to provide an annular air intake space, one-way valve means carried by said plunger tube for sealing off said annular space during the movement of said latter tube toward the discharge end of said outer tubular member and for providing an open passage for air into a pumping space ahead of said plunger tube during the movement of the latter tube toward the other end of said outer tubular member, and dispensing valve means at the discharge or inner end of said plunger tube for dispensing a limited quantity of material therefrom into said pumping space after the termination of each compression stroke thereof, said dispensed material being forced out of said pumping space and through said discharge orifice means during each compression stroke.

8. In a spray gun of the plunger type wherein there is provided an outer casing member having a discharge orifice at the bottom end thereof and a plunger tube reciprocally mounted in said outer member for up and down movement therein, the plunger tube having a compartment therein for holding a supply of the material to be sprayed, the improvement comprising a dispensing valve assembly carried on the bottom of said plunger tube for dispensing a limited supply of said material each pumping cycle from said compartment therein into a pumping space below said plunger tube, said valve construction including means forming a well communicating at its top with the bottom of said plunger tube compartment through a opening or passage, said material flowing into said well from said plunger tube compartment through force of gravity, said well-forming means having a passage which communicates between the bottom of the well and said pumping space to enable the leakage of material from said well into said pumping space during the upward movement of said plunger tube inside of said outer casing member, a valve head for closing said opening or passage, means resiliently forcing said valve ahead toward said opening for closing the same to prevent leakage of material from said plunger tube compartment, stop means near the bottom of said outer tube which is in the path of movement of said plunger tube bottom, and valve operating means connected to said resiliently urged valve head which strikes said stop means when said plunger tube has reached a point near the bottom of its path of travel which moves the valve head away from said plunger tube opening to enable the flow of material to be sprayed into said well, and means for sealing off said passage at the bottom of said well while the plunger tube is in its lowermost position to prevent leakage of material from said well into said pumping space until the plunger tube is moved upward.

9. In a spray gun of the plunger type wherein there is provided an outer casing member having a discharge orifice at the bottom end thereof and a plunger tube reciprocally mounted in said outer member for up and down movement therein, the plunger tube having a compartment therein for holding a supply of the material to be sprayed, the improvement comprising a dispensing valve construction carried on the bottom of said plunger tube for dispensing a limited supply of said material each pumping cycle from said compartment therein into a pumping space below said plunger tube, said valve construction including means forming a well communicating at its top with the bottom of said plunger tube compartment through an opening or passage, said material flowing into said well from said plunger tube compartment through force of gravity, a valve head for closing the latter opening, means resiliently forcing said valve ahead toward said opening for closing the same to prevent leakage of material from said plunger tube compartment, said well-forming means having a restricted passage which communicates between the bottom of the well and said pumping space to enable the slow leakage of material from said well into said pumping space during the upward movement of said plunger tube inside of said outer casing member, and valve operating means connected to said resiliently urged valve head which strikes a portion of said outer casing member when said plunger tube has reached a point near the bottom of its path of travel which moves the valve head away from said plunger tube opening to enable the flow of material to be sprayed into said well.

10. In a spray gun of the plunger type wherein there is provided an outer casing member having a discharge orifice at the bottom end thereof and a plunger tube reciprocally mounted in said outer member for up and down movement therein, the plunger tube having a compartment therein for holding a supply of the material to be sprayed, the improvement comprising a dispensing valve construction carried on the bottom of said plunger tube for dispensing a limited supply of said material each pumping cycle from said compartment therein into a pumping space below said plunger tube, said valve construction including means forming a well communicating at its top with the bottom of said plunger tube compartment through an opening or passage, said material flowing into said well from said plunger tube compartment through force of gravity, said well having a usuable volume equal to the amount of material to be dispensed by the spray gun each pumping cycle, a valve head at the top of said valve stem for closing the latter opening, means resiliently forcing said valve ahead toward said opening for closing the same to prevent leakage of material from said plunger tube compartment, said well-forming means having a restricted passage which communicates between the bottom of the well and said pumping space to enable the slow leakage of substantially all of the material from said well into said pumping space during the upward movement of said plunger tube inside of said outer casing member, and valve operating means connected to said resiliently urged valve head which strikes a portion of said outer casing member when said plunger tube has reached a point near the bottom of its path of travel which moves the valve head away from said plunger tube opening to enable the flow of material to be sprayed into said well.

11. In a spray gun of the plunger type wherein there is provided an outer casing member having a discharge orifice at the bottom end thereof and a plunger tube reciprocally mounted in said outer member for up and down movement therein, the plunger tube having a compartment therein for holding a supply of the material to be sprayed, the improvement comprising a dispensing valve construction carried on the bottom of said plunger tube for dispensing a limited supply of said material each pumping cycle from said compartment therein into a pumping space below said plunger tube, said valve construction including means forming a well communicating at its top with the bottom of said plunger tube compartment through an opening or passage, said material flowing into said well from said plunger tube compartment through force of gravity, valve stem means extending through said well, a valve head at the top of said valve stem and above said opening or passage for closing the latter opening, means forming an upwardly facing shoulder at the bottom of said valve stem means, a spring compressed between the plunger tube bottom and said shoulder for forcing said valve stem means and hence said valve head downward to close said opening, said well-forming means having a passage between it and the valve stem which passage communicates between the bottom of the well and said pumping space to enable the leakage of material from said well into said pumping space during the upward movement of said plunger tube inside of said outer casing member, said valve stem means near the bottom of the stroke of the plunger tube striking a bottom portion of said outer casing member to raise the valve head from said plunger tube opening to enable the flow of material to be sprayed from said plunger tube compartment into said well.

12. In a spray gun of the plunger type wherein there is provided an outer casing member having a discharge orifice at the bottom end thereof and a plunger tube reciprocally mounted in said outer member for up and down movement therein, the plunger tube having a compartment therein for holding a supply of the material to be sprayed, the improvement comprising a dispensing valve construction carried on the bottom of said plunger tube for dispensing a limited supply of said material each pumping cycle from said compartment therein into a pumping space below said plunger tube, said valve construction including means forming a well communicating at its top with the bottom of said plunger tube compartment through an opening or passage, said material flowing into said well from said plunger tube compartment through force of gravity, a valve head for closing the latter opening, means resiliently forcing said valve ahead toward said opening for closing the same to prevent leakage of material from said plunger tube compartment, said well-forming means having a passage which communicates between the bottom of the well and said pumping space to enable the leakage of material from said well into said pumping space during the upward movement of said plunger tube inside of said outer casing member, and valve operating means connected to said resiliently urged valve head which strikes a portion of said outer casing member when said plunger tube has reached a point near the bottom of its path of travel which moves the valve head away from said plunger tube opening to enable the flow of material to be sprayed into said well.

13. In a spray gun of the plunger type wherein there is provided an outer elongated tubular member having a discharge orifice at one end and an elongated plunger reciprocally mounted for up and down movement in said outer tubular member, there being in said gun a compartment therein for holding a supply of the material to be sprayed and dispensing valve means for dispensing a limited amount of the material to be sprayed into a pumping space below said plunger at the discharge end of said outer elongated tubular member, the improvement comprising means at the discharge end of said outer tubular member forming an outer end closure wall which has an inclined portion inclining toward the axis of the outer member in a direction extending away from the outer tubular member, said inclined wall portion having said discharge orifice therein communicating with said pumping space, the fluid stream provided by said discharge orifice being directed laterally and forwardly of the outer elongated tubular member, said inclined wall portion and orifice therein selectively enabling a generally upwardly or downwardly directed fluid stream, while the discharge end of the spray gun is inclined downwardly, by rotation of the gun about its longitudinal axis.

14. In a spray gun of the plunger type wherein there is provided an outer elongated tubular member having a discharge orifice at one end and an elongated plunger tube reciprocally mounted for up and down movement in said outer tubular member and having a compartment therein for holding a supply of the material to be sprayed and dispensing valve means for dispensing a limited amount of the material to be sprayed by gravity into a pumping space below said plunger tube at the discharge end of said outer elongated tubular member, the improvement comprising means at the discharge end of said outer tubular member forming an outer end closure wall which has an inclined portion inclining toward the axis of the outer member in a direction extending away from the outer tubular member, said inclined wall portion having said discharge orifice therein communicating with said pumping space, the fluid stream provided by said discharge orifice being directed laterally and forwardly of the outer elongated tubular member, said inclined wall portion and orifice therein selectively enabling a generally upwardly or downwardly directed fluid stream, while the discharge end of the spray gun is inclined downwardly to provide for gravity feed of said pumping space, by rotation of the gun about its longitudinal axis.

15. In a spray gun of the plunger type wherein there is provided an outer casing member and a plunger reciprocably mounted for movement in said outer member, there being in said gun a compartment for holding a supply of the material to be sprayed and valve means for dispensing a limited amount of the material to be sprayed into a pumping space ahead of said plunger at a discharge end of said outer casing member, the improvement comprising means at the discharge end of said outer casing member forming an outer end closure wall having a discharge orifice therein communicating with said pumping space, and a transverse wall between said pumping space and an unobstructed space defined by said outer end closure wall, said transverse wall having an opening therein which is large relative to said discharge orifice, said opening and discharge orifice being on opposite sides of the longitudinal axis of movement of said plunger in said outer member, said transverse wall thereby providing a tortuous path for the flow of air and said material to be sprayed suspended therein between said pumping space and discharge orifice.

16. In a spray gun of the plunger type wherein there is provided an outer casing member and a plunger reciprocably mounted for movement in said outer member, there being in said gun a compartment for holding a supply of the material to be sprayed and valve means for dispensing a limited amount of the material to be sprayed into a pumping space ahead of said plunger at a discharge end of said outer casing member, the improvement comprising means at the discharge end of said outer casing member forming an outer end closure wall having a discharge orifice therein communicating with said pumping space, and only a single transverse wall between said pumping space and an unobstructed space defined by said outer end closure wall, said transverse wall having an opening therein which is large relative to said discharge orifice, said opening and discharge orifice being on opposite sides of the longitudinal axis of movement of said plunger in said outer member, said transverse wall thereby providing a tortuous path for the flow of air and said material to be sprayed, which may be liquid or powder, suspended therein between said pumping space and discharge orifice.

17. In a spray gun of the plunger type wherein there is provided an outer casing member and a plunger reciprocably mounted for movement in said outer member, a compartment for holding a supply of the material to be sprayed and valve means for dispensing a limited amount of the material to be sprayed into a pumping space ahead of said plunger at a discharge end of said outer casing member, the improvement comprising means at the discharge end of said outer casing member forming an outer end closure wall having a discharge orifice therein communicating with said pumping space, and a pair of closely, axially spaced walls between said pumping space and an unobstructed space defined by said outer end closure wall, the innermost of said transverse walls having an opening on the side thereof nearest the discharge orifice and the outermost transverse wall having an opening, said opening and discharge orifice being on opposite sides of the longitudinal axis of movement of said plunger in said outer member, there being provided by the space between said transverse walls and said unobstructed space a tortuous path for the flow of air and said material to be sprayed suspended therein between said pumping space and discharge orifice to ensure maximum admixture thereof.

18. In a spray gun of the plunger type wherein there is provided an outer elongated tubular casing member and an elongated plunger tube reciprocably mounted for longitudinal movement in said outer tubular member and having a compartment therein for holding a supply of the material to be sprayed and valve means for dispensing a limited amount of the material to be sprayed into a pumping space ahead of said plunger tube at a discharge end of said outer member, the improvement comprising means at the discharge end of said outer tubular member forming an outer end closure wall which has an inclined annular portion inclining toward the axis of the outer member in a direction extending away from the outer tubular member, said inclined wall portion having a discharge orifice therein communicating with said pumping space, and a transverse wall between said pumping space and an unobstructed space defined by said outer end closure wall, said transverse wall having an opening therein which is large relative to said discharge orifice, said opening and discharge orifice being on opposite sides of the longitudinal axis of movement of said plunger in said outer member, said transverse wall thereby providing a tortuous path for the flow of air and said material to be sprayed suspended therein between said pumping space and discharge orifice.

19. A spray gun comprising an outer elongated cylindrical tube made of a transparent plastic material, an inner elongated cylindrical plunger tube also made of a transparent plastic material telescoped within the upper end of the outer tube and having a length of the same order of magnitude as said outer tube, the upper end of said inner tube being engageable by the hand of an operator and being thus reciprocable into extreme positions wherein the bottom end thereof is respectively near the upper and lower ends of said outer tube, the bottom end of said outer tube having a generally dome-shaped end cap secured thereto which defines an unobstructed air mixing space therein and has a discharge orifice communicating with said mixing space, said discharge orifice being in an inwardly and downwardly inclined portion of the dome-shaped end cap so that the fluid stream to be directed therefrom can be directed upward or downward by rotating the spray gun about its longitudinal axis, and baffle means at said inner tube end comprising at least one wall extending transversely across the inner end of said outer tube between said mixing space in said end cap and a pumping space inside said outer tube, said baffle wall having an opening many times larger than said discharge orifice and located on the side thereof diametrically opposite the side nearest said discharge orifice, whereby a tortuous path is formed between said pumping space and mixing space to provide for a thorough admixture of the material to be sprayed and air.

20. In a spray gun of the plunger type having a plunger tube which, in addition to its pumping function defines a storage compartment for the material to be sprayed, said plunger tube having a closure cap at its lower end, the latter cap having a central boss depending from the inner end of the plunger tube and having a valve-seat-forming recess in the upper portion thereof and a passageway communicating between said recess and the bottom end of the boss, valve stem means passing freely through said passageway, a valve head connected to the top of said valve stem means and seated around the top of said passageway normally to prevent leakage of the material to be sprayed in said plunger tube into the pumping space below the plunger tube, shoulder-forming means on the bottom of said valve stem means, a spring positioned around said closure cap boss and compressed between said shoulder-forming means and the closure cap to force the valve head into its valve closing position, said valve head being moved into a valve-open position when the bottom of said valve stem means strikes a bottom portion of said outer tube, and one-way valve means on said plunger tube for forming an air tight seal between said plunger tube and outer tube during downward movement of said plunger tube and for breaking such seal during upward movement of said plunger tube.

21. In a spray gun of the plunger type having a plunger tube which, in addition to its pumping function, defines a storage compartment for the material to be sprayed, said plunger tube having a closure cap at its lower end, the latter cap having a central boss depending from the inner end of the plunger tube and having a valve-seat-forming recess in the upper portion thereof, and a passageway communicating between said recess and the bottom end of the boss, valve stem means passing freely through said passageway, a valve head connected to the top of said valve stem means and seated around the top of said passageway normally to prevent leakage of the material to be sprayed in said plunger tube into the pumping space below the plunger tube, shoulder-forming means on the bottom of said valve stem means, a spring positioned around said closure cap boss and compressed between said shoulder-forming means and the closure cap to force the valve head into its valve closing position, said valve head being moved into a valve-open position when the bottom of said valve stem means strikes a bottom portion of said outer tube, and one-way valve means on said plunger tube for forming an air tight seal between said plunger tube and outer tube during downward movement of said plunger tube and for breaking such seal during upward movement of said plunger tube, said valve means comprising flexible means braced by said spring means against said bottom end cap of said plunger tube, the peripheral portion of said flexible means being axially flexible and making free sliding, sealing contact with the inner surface of said outer tube during downward movement of said plunger tube and flexing downwardly during upward movement of said plunger tube to admit air into the pumping space below the plunger tube.

22. In a spray gun of the plunger type having a plunger tube which, in addition to its pumping function, defines a storage compartment for the material to be sprayed, said plunger tube having a closure cap at its lower end, the latter cap having a central boss depending from the inner end of the plunger tube and having a valve-seat-forming recess in the upper portion thereof, a well extending from the center and bottom of the valve-seat-forming recess and a relatively small bore extending between the well bottom and the bottom end of the boss, valve stem means passing freely through said well and bore, a valve head connected to the top of said valve stem means and seated around the top of said well normally to prevent leakage of the material to be sprayed in said plunger tube into the pumping space below the plunger tube, shoulder-forming means on the bottom of said valve stem means, and a spring positioned around said closure cap boss and compressed between said shoulder-forming means and said cap to force the valve head into its valve closing position, said valve head being moved into a valve-open position when the bottom of said valve stem means strikes a bottom portion of said outer tube.

23. A spray gun comprising an outer elongated cylindrical tube, an open-ended inner elongated cylindrical plunger tube telescoped within the upper end of the outer tube and having a length of the same order of magnitude as said outer tube, the upper end of said inner tube being engageable by the hand of an operator and being thus reciprocable into extreme positions wherein the bottom end thereof is respectively near the upper and lower ends of said outer tube, the bottom end of said outer tube having an end cap secured thereto which end cap defines an unobstructed air mixing space therein and has a discharge orifice communicating with said mixing space, baffle means at said outer tube end comprising at least one wall extending transversely across the inner end of said outer tube between said mixing space in said end cap and a pumping space inside said outer tube, said baffle wall having an opening many times larger than said discharge orifice and located on the side thereof diametrically opposite the side nearest said discharge orifice, whereby a tortuous path is formed between said pumping space and mixing space to provide for a thorough admixture of the material to be sprayed and air, said plunger tube forming a compartment for storing the material to be sprayed and having a top closure cap at its upper end and a bottom closure cap at its lower end, the latter cap having a central boss depending from the inner end of the plunger tube and having a valve-seat-forming recess in the upper portion thereof and a passageway between said recess and the bottom end of the boss, valve stem means passing freely through said passageway, a valve head connected to the top of said valve stem means and seated around the top of said passageway normally to prevent leakage of the material to be sprayed in said plunger tube into the pumping space below the plunger tube, shoulder-forming means on the bottom of said valve stem means, a spring positioned around said end cap and compressed between said shoulder-forming means and the bottom end cap of said plunger tube to force the valve head into its valve closing position, said valve head being moved into a valve-open position when the bottom of said valve stem means strikes said baffle wall, and one-way valve means on said plunger tube for forming an air tight seal between said plunger tube and outer tube during downward movement of said plunger tube and for breaking such seal during upward movement of said plunger tube, said valve means comprising flexible means braced by said spring means against said bottom end cap of said plunger tube, the peripheral portion of said flexible means being axially flexible and making free sliding, sealing contact with the inner surface of said outer tube during downward movement of said plunger tube and flexing downwardly during upward movement of said plunger tube to admit air into the pumping space below the plunger tube.

24. In a spray gun of the plunger type wherein there is provided an outer casing member and a plunger reciprocably mounted for movement in said outer member, there being in said gun a compartment for holding a supply of the material to be sprayed and valve means for dispensing a limited amount of the material to be sprayed into a pumping space ahead of said plunger at a discharge end of said outer casing member, the improvement in said valve means comprising a valve head covering a dispensing opening leading to said supply compartment which is normally air-tight, valve head operating means connected to said valve head for moving the same away from said dispensing opening, spring means operating to urge said valve head into a dispensing opening closing position, means on said valve head operating means against which bears the back pressure built up in said pumping space during the compression stroke of the plunger, the back pressure acting against the force of said spring means, the force of said spring means being such that said back pressure moves the valve head against the force of the spring means slightly away from said dispensing opening to enable air to enter said supply compartment to build up pressure therein without consequent leakage of material therefrom, and means responsive to the movement of the plunger to a point contiguous to the end of its compression stroke for actuating said valve head operating means to move the valve head away from said dispensing opening to a position where material in said supply compartment can be readily discharged therethrough, the discharge of material through said opening being effected at least in part by the pressure built up in said supply compartment.

25. A spray gun comprising an outer tubular member having an external discharge orifice means at one end thereof, a plunger tube for holding a supply of said material to be sprayed slidably telescoped within said outer tubular member, said plunger tube having a hand-receiving portion so that the inner end of the same can be reciprocated in said outer tubular member, and an air inlet passage extending from the outside of said outer tubular member to a pumping space ahead of said plunger tube and bypassing said plunger tube for sealing off said air inlet passage during the movement of said latter tube toward the discharge end of said outer tubular member and for opening the same to provide an open passage for air into said pumping space ahead of said plunger tube during the movement of the latter tube toward the other end of said outer tubular member, and dispensing valve means at the discharge or inner end of said plunger tube for dispensing a limited quantity of material therefrom into said pumping space after the termination of each compression stroke thereof, said dispensed material being forced out of said pumping space and through said discharge orifice means during each compression stroke.

References Cited in the file of this patent
UNITED STATES PATENTS

| | | |
|---|---|---|
| 947,906 | Hall | Feb. 1, 1910 |
| 1,272,283 | Madden | July 9, 1918 |
| 2,443,549 | Zabriskie | June 15, 1948 |
| 2,514,516 | Root | July 11, 1950 |
| 2,596,011 | Darley | May 6, 1952 |